United States Patent [19]
Hasegawa

[11] Patent Number: 6,141,444
[45] Date of Patent: *Oct. 31, 2000

[54] METHOD FOR DELETING RULED LINES AND A RECORDING MEDIUM STORING PROGRAMS FOR PERFORMING THE METHOD

[75] Inventor: Fumihiro Hasegawa, Kanagawa, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/982,355

[22] Filed: Dec. 2, 1997

[30] Foreign Application Priority Data

Dec. 5, 1996 [JP] Japan .................................. 8-325354

[51] Int. Cl.[7] .............................. G06K 9/34; G06K 9/00; H04N 1/40; H04N 1/38; H04N 1/387
[52] U.S. Cl. .......................... 382/175; 382/171; 382/173; 382/168; 358/462; 358/464; 358/453
[58] Field of Search ..................................... 382/168, 170, 382/171, 172, 173, 174, 176, 202, 203, 245, 175, 282; 358/462, 464, 467, 453

[56] References Cited

U.S. PATENT DOCUMENTS

| | | | |
|---|---|---|---|
| 4,292,622 | 9/1981 | Henrichon, Jr. | 382/177 |
| 5,119,437 | 6/1992 | Kuwamura et al. | 382/171 |
| 5,335,290 | 8/1994 | Cullen et al. | . |
| 5,563,403 | 10/1996 | Bessho et al. | 250/208.1 |

FOREIGN PATENT DOCUMENTS 0 177 823  4/1986  European Pat. Off. .

*Primary Examiner*—Leo H. Boudreau
*Assistant Examiner*—Dimitry A. Novik
*Attorney, Agent, or Firm*—Oblon, Spivak, McClelland, Maier & Neustadt, P.C.

[57] ABSTRACT

A ruled line deleting method which accurately deletes a ruled line existing adjacent to a border of an area for filling characters in an image obtained from a ruled form without increasing a probability of occurrence of an erroneous deletion of a character. A scanning area is defined on the image of the ruled form based on each border of the character area. Black runs are extracted from the scanning area, each of the black runs having a length greater than a predetermined length. The black pixels corresponding to the extracted black runs are changed to white pixels in the image of the ruled form.

10 Claims, 16 Drawing Sheets

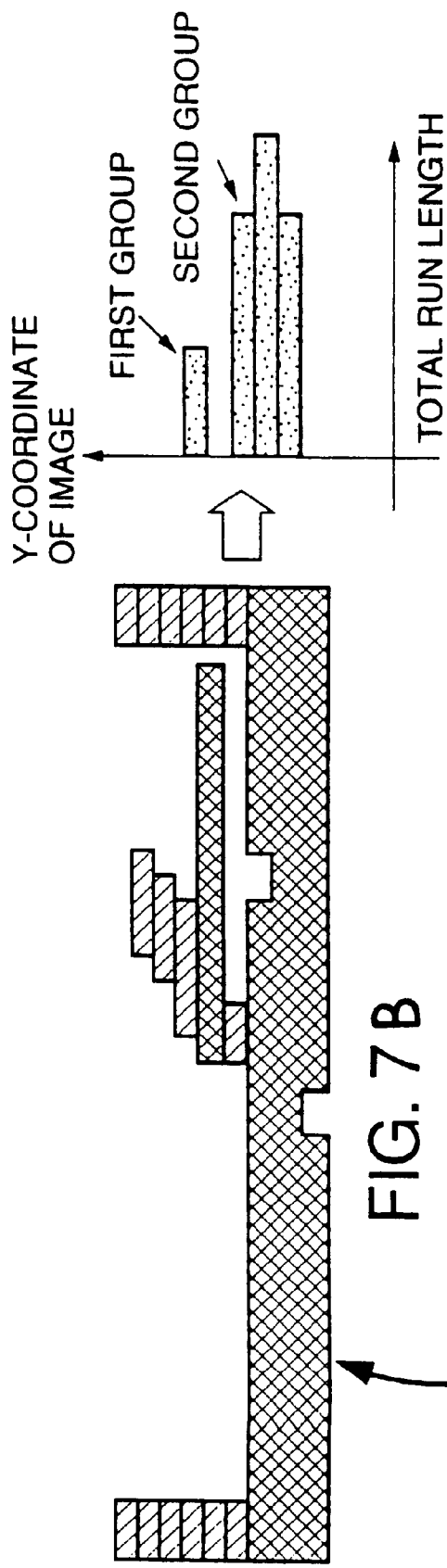

■ BLACK RUN CORRESPONDING TO RULED LINE
▨ BLACK RUN CAUSED BY ERRONEOUS BINARIZATION
▧ BLACK RUN CAUSED BY ROUNDING OF CORNER

METHOD FOR DELETING RULED LINES AND A RECORDING MEDIUM STORING PROGRAMS FOR PERFORMING THE METHOD

BACKGROUND OF THE INVENTION

1. Field of the Invention

The present invention generally relates to an image processing technique and, more particularly, to a technique which is used for accurately recognizing characters filled in an area defined by ruled lines by deleting the ruled lines existing adjacent to the characters in an image of a ruled form.

2. Description of the Related Art

Japanese Laid-Open Patent Application No. 7-57047 discloses a method for deleting a ruled line in an image obtained from a document containing characters and ruled lines. In this technique, an entire image of the document is scanned so as to extract lines extending in a predetermined direction. Each of the extracted lines is classified into either a ruled line group or a character group in accordance with a ratio of a vertical length and a horizontal length of a circumscribed rectangle which encircles a group of adjacent lines. In order to obtain an image corresponding to only characters, a part of the ruled line group which does not overlap the character group is deleted so that the lines corresponding to a character are not deleted.

In the above-mentioned conventional technique, an entire image must be processed and, thus, there is a problem in that it takes a long time to complete a ruled line deleting process. Additionally, in the conventional technique, since a group of lines is classified into ruled lines or characters, if a threshold level is set so that a short ruled line is positively determined to be a ruled line, a stroke of a character may be determined to be a ruled line. Contrary, if the threshold level is set to decrease probability of occurrence of such an erroneous recognition, a short ruled line cannot be deleted since it is determined to be a part of a character. Accordingly, there is a problem in that it is difficult to simultaneously achieve both accurate deletion of ruled lines and accurate prevention of erroneous deletion of characters.

SUMMARY OF THE INVENTION

It is a general object of the present invention to provide an improved and useful ruled line deleting method in which the above-mentioned problems are eliminated.

A more specific object of the present invention is to provide a ruled line deleting method which accurately deletes a ruled line existing adjacent to a border of an area for filling characters in an image obtained from a ruled form without increasing probability of occurrence of an erroneous deletion of a character.

Another object of the present invention is to provide a ruled line deleting method which reduces a process time for deleting ruled lines in an image obtained from a ruled form.

In order to achieve the above-mentioned operation, there is provided according to the present invention a method for deleting a ruled line in an image of a ruled form which is provided with ruled lines for defining at least one character area to be filled with characters, the method comprising the steps of:

(a) defining a scanning area on the image of the ruled form which encompasses the ruled lines and a portion of a character area which is within a predetermined distance from the ruled lines which define a border of said character area;

(b) extracting from said ruled line to be deleted black runs having a length greater than a predetermined length from said scanning area; and, (c) changing black pixels corresponding to the extracted black runs to white pixels in the image of said ruled line to be deleted.

According to the above-mentioned invention, since the scanning area is defined for determining an accurate position of a ruled line which exists on the border of the character area, there is no need to scan the entire image of the ruled form. Thus, the process time for determining the positions of ruled lines on the image of the ruled form is reduced.

In the above-mentioned method, step c) may comprise the steps of:

c-1) selecting black runs corresponding to a ruled line from among the extracted black runs; and c-2) changing black pixels corresponding to the black runs selected in step c-1) to white pixels.

Since the scanning area may include black runs which correspond to a part of a character written in the character area, only the black runs corresponding to a ruled line are selected before deleting the black runs extracted from the scanning area.

Additionally, step c-1) may comprise the steps of:

c-1-1) summing lengths of black runs which extend in the same coordinate position of a coordinate axis perpendicular to the extending direction of the black runs, the summing being performed for each coordinate position in the scanning area;

c-1-2) grouping the black runs having consecutive coordinate positions;

c-1-3) determining a group of black runs which has the maximum summed length; and c-1-4) selecting black runs included in the group determined by step c-1-3).

According to this invention, when a long black run which corresponds to a part of character exists in the scanning area, the long black run adjacent to a black run corresponding to a ruled line is determined to be included in a group other than the group which corresponds to the ruled line. Thus, an erroneous deletion of the long black run corresponding to a part of a character can be prevented while a short black run corresponding to the ruled line is accurately deleted.

Additionally, the method according to the present invention may further comprise the steps of:

d) extracting circumscribed rectangles from the scanning area of the image which has been obtained by executing step c), each of the circumscribed rectangles including black pixels consecutive in the extending direction of the ruled line;

e) selecting a circumscribed rectangle from among the extracted circumscribed rectangles so that the selected circumscribed rectangle is in contact with one of the black runs extracted in step b) and a length of the selected black run in a direction perpendicular to an extending direction of the one of the black runs is less than a predetermined value; and f) changing black pixels corresponding to the black runs included in the circumscribed rectangle selected in step e) to white pixels.

A short black run which is generated due to an erroneous binarization may remain in the image after the black runs having lengths greater than the predetermined length are deleted. However, according to this invention, such a short black run generated due to an erroneous binarization can be positively deleted by extracting the short black run to be deleted after the long black runs corresponding to the ruled line are deleted.

Additionally, the method according to the present invention may further comprise the steps of:

g) extracting circumscribed rectangles from the scanning area of the image which has been obtained by executing step c), each of the circumscribed rectangles including black pixels consecutive in the extending direction of the ruled line;

h) selecting a circumscribed rectangle from among the extracted circumscribed rectangles so that the selected circumscribed rectangle is in contact with two of the black runs extracted in step b), the two black runs intersecting with each other; and i) changing black pixels corresponding to the black runs included in the circumscribed rectangle selected in step h) to white pixels.

A short black run which is generated due to rounding of a corner of an intersection of ruled lines may remain in the image after the black runs having lengths greater than the predetermined length are deleted. However, according to this invention, such a short black run can be positively deleted by extracting the short black run to be deleted after the long black runs corresponding to the ruled line are deleted.

The method according to the present invention may be carried out by a conventional computer which executes programs which implement the method according to the present invention. The programs may be recorded on a recording medium such as a CD-ROM.

Other objects, features and advantages of the present invention will become more apparent from the following detailed description when read in conjunction with the accompanying drawings.

BRIEF DESCRIPTION OF THE DRAWINGS

FIG. 7 is an illustration for explaining the operation of the ruled line component selecting unit shown in FIG. 1;

DETAILED DESCRIPTION OF THE PREFERRED EMBODIMENTS

Figure 1:
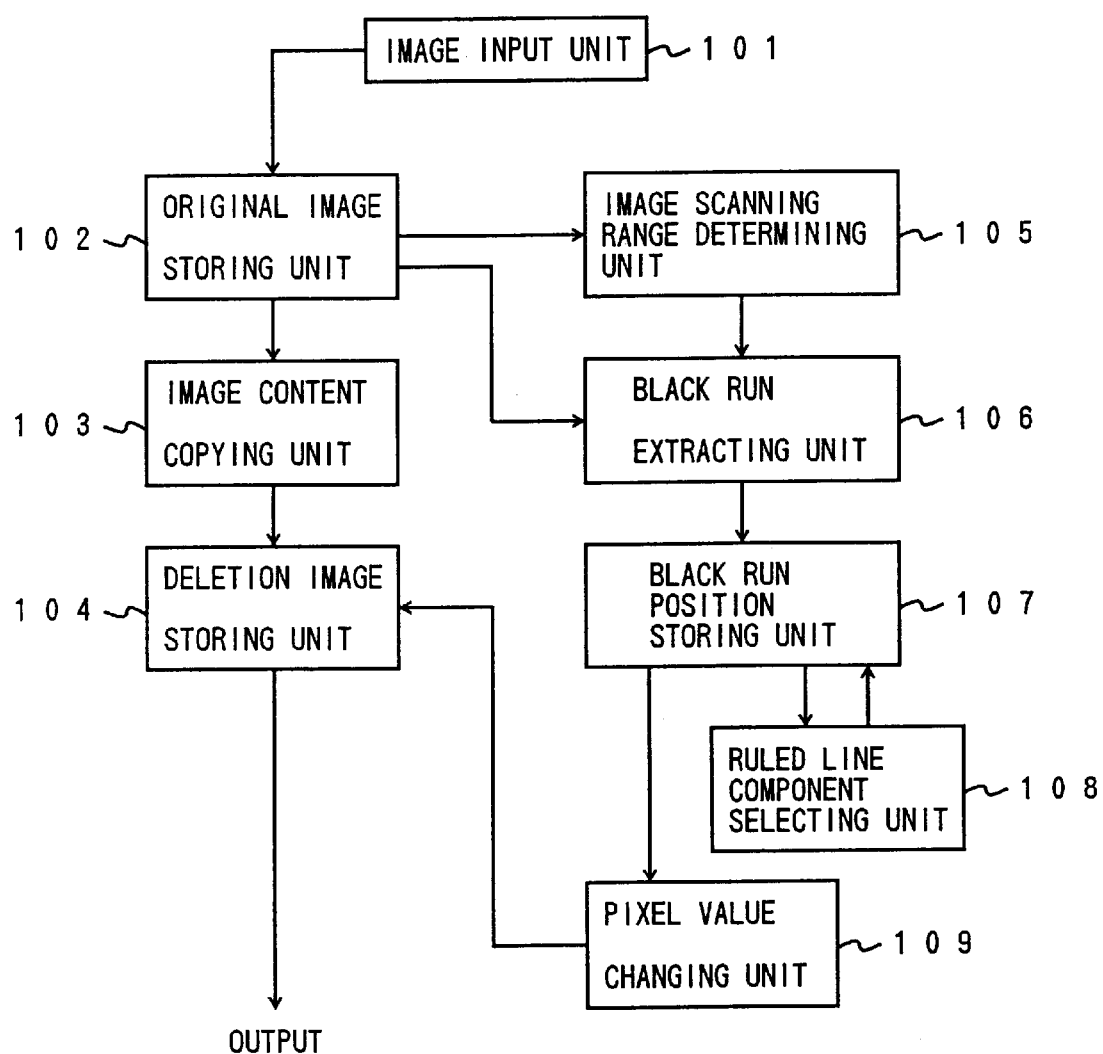
FIG. 1 is a block diagram of a ruled line deleting apparatus according to a first embodiment of the present invention.

A description will now be given of a first embodiment of the present invention. FIG. 1 is a block diagram of a ruled line deleting apparatus according to the first embodiment of the present invention. The ruled line deleting apparatus shown in FIG. 1 deletes ruled lines from an image of a ruled form which is prepared for filling characters or numbers in a block defined by ruled lines. The ruled form has a fixed form, and information with respect to positions of the ruled lines in the fixed form is previously known. Such information with respect to the ruled form may be previously stored in the ruled line deleting apparatus or provided to the apparatus as input data when a ruled line deleting operation is executed. The deletion of ruled lines is performed prior to a character recognition so that extraction of characters from the image of the ruled form is not interfered with by the ruled lines.

As shown in FIG. 1, the ruled line deleting apparatus comprises an image input unit 101 such as a scanner, an original image storing unit 102, an image content copying unit 103, a deletion image storing unit 104, an image scanning range determining unit 105, a black run extracting unit 106, a black run position storing unit 107, a ruled line component selecting unit 108 and a pixel value changing unit 109.

Figure 2:
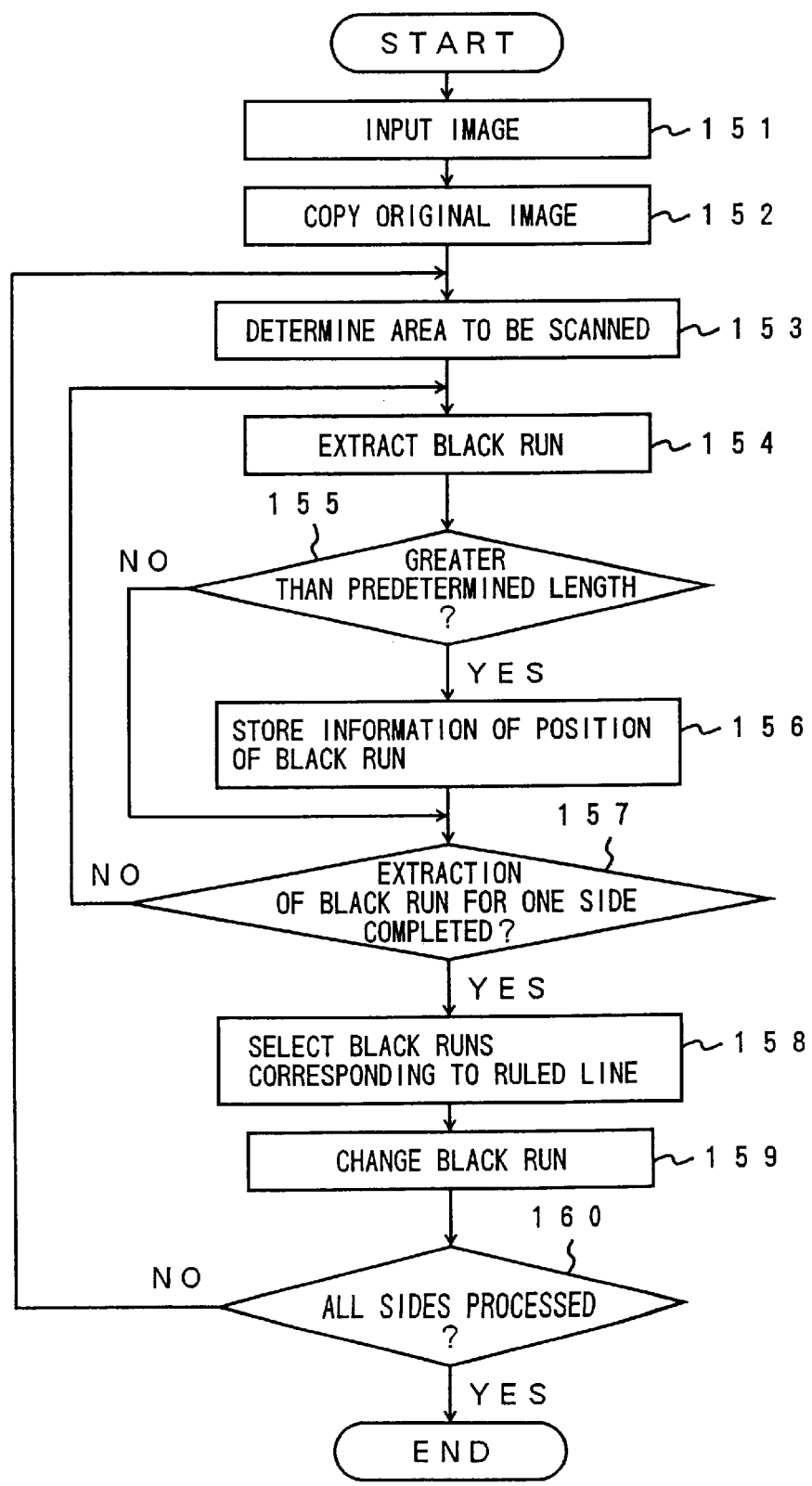
FIG. 2 is a flowchart for a ruled line deleting operation performed by the ruled line deleting apparatus shown in FIG. 1.

A description will now be given, with reference to FIG. 2, of an operation of the ruled line deleting apparatus shown in FIG. 1. FIG. 2 is a flowchart for a ruled line deleting operation performed by the ruled line deleting apparatus shown in FIG. 1.

When the operation shown in FIG. 2 is started, an original document which is a ruled form is read, in step 151, by the image input unit 101 such as a scanner. An image obtained by reading the original document is stored in the original image storing unit 102. Then, in step 152, the original image, which comprises binary image data and is stored in the original image storing unit 102, is copied to the deletion image storing unit 104 by the image content copying unit 103. Hereinafter, the binary image data stored in the original image data storing unit 102 is referred to as an original image, and the image data stored in the deletion image storing unit 104 is referred to as a deletion image.

Figure 3:
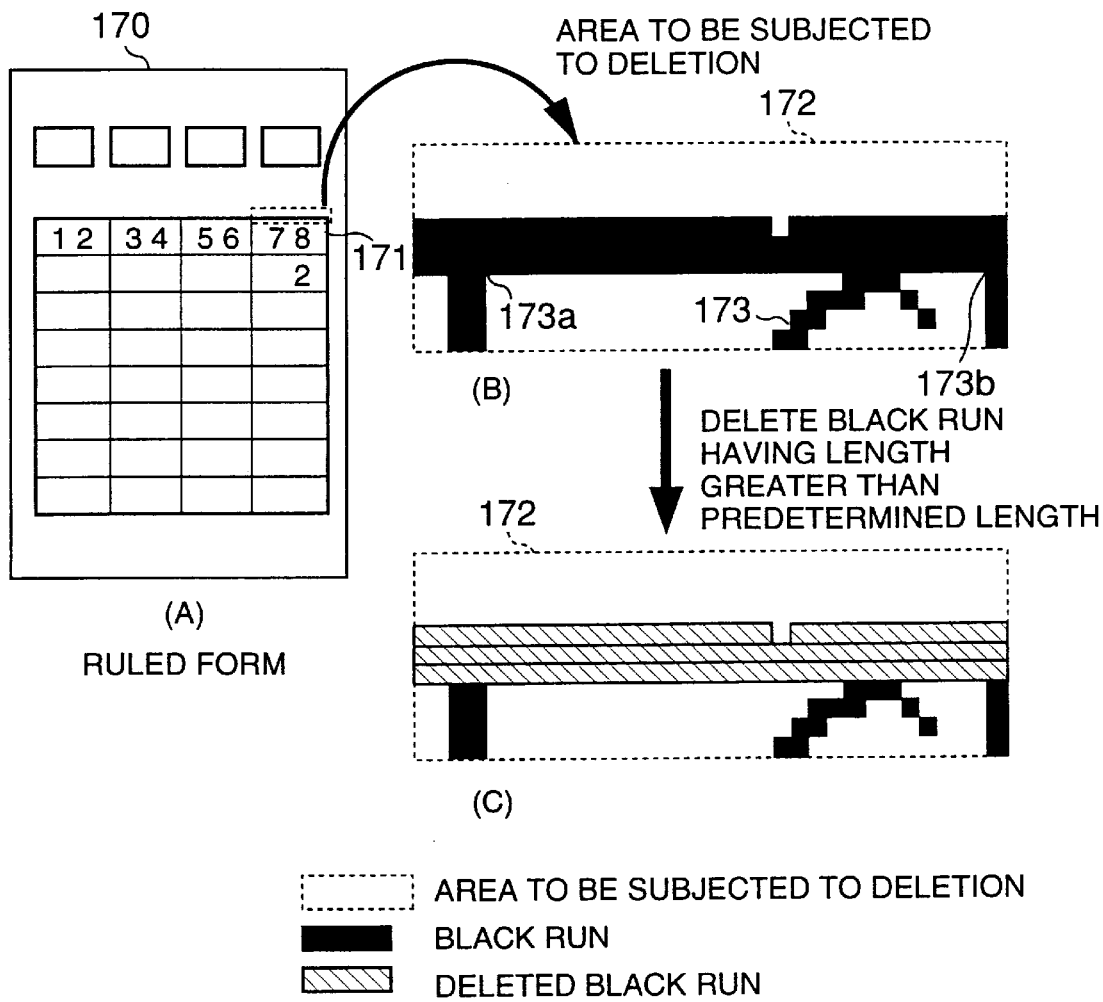
FIG. 3 is an illustration for explaining a process for deleting a ruled line.

FIG. 3 is an illustration for explaining a process for deleting a ruled line. FIG. 3-(A) shows an example of the ruled form. The ruled form 170 is provided with vertical and horizontal ruled lines so as to define areas 171 in which characters or numbers are filled. Hereinafter, the area 171 is referred to as a character area. In the example shown in FIG. 3-(A), numbers 1, 2, . . . , 8 are written in the character areas 171. The ruled line deleting apparatus deletes ruled lines in the image of the ruled form 170. A border of each character area is defined by the ruled lines. The deletion of the ruled lines are performed for the top side, the bottom side, the left side and the right side, in that order.

First, in step 153, an area which is scanned for detecting a ruled line is determined by the image scanning range determining unit 105. More specifically, coordinate values of each character area, that is, for example, an upper left vertex and a lower right vertex of the character area are obtained from the original image. Since each character area is located at a predetermined position in the ruled form, the ruled lines may be deleted in accordance with the location of each character area which is known previously. However, the image scanned by the image input unit 101 may be offset from an image previously stored in the ruled line deleting apparatus due to, for example, a skew of the original document when it is scanned.

The amount of offset can be detected by comparing a location (coordinate value) of a reference point provided on the ruled form with a location (coordinate value) of the reference point in the previously stored information with respect to the ruled form. The reference point may be a mark provided in a predetermined position of each ruled form. For example, a character or a part of the character which is printed on the ruled form together with the ruled lines may be used as the reference point. Alternatively, a top side or a bottom side of the ruled form may be detected by scanning a part of the original image so as to detect the amount of offset. The part to be scanned can be a small area.

Then, the coordinate values of each of the character areas are obtained by referring to the reference point data previously stored in the ruled line deleting apparatus. However, if the offset of the original image can be ignored, the process for scanning the original image for obtaining the reference point may be omitted.

An area to be scanned for detecting the ruled line is performed with respect to each side of each character area. In the present embodiment, the area to be scanned is determined based on a boundary of each character area. Specifically, as shown in FIG. 3-(B), for example, the area 172 to be scanned for detecting the ruled line of the upper side of the character area 171 is determined to be an area within a predetermined distance from the upper boundary (between a corner 173 and a corner 173*b*) of the character area 171 in the vertical direction, and a predetermined distance from each of the corners 173*a* and 173*b*. An area to be scanned for each of the bottom side, the left side and the right side of the character area 171 is obtained in a similar manner.

Referring to FIG. 2, the area to be scanned is determined in step S153, by the image scanning range determining unit 105. Then, first, the area 172 for the upper side of the character area 171 is scanned, in step 154, by the black run extracting unit 106 so as to extract all black runs extending in a horizontal direction (primary scanning direction). That is, it is determined, in step 155, whether or not the extracted black run has a length greater than a predetermined length. If the extracted black run has a length greater that the predetermined length, the routine proceeds to step 156. In step 156, information with respect to a position (coordinate values of opposite ends of the black run) of the black run having a length greater than the predetermined length is stored in the black run position storing unit 107. This operation is performed for the entire area 171. Then, it is determined, in step 157, whether or not all black runs in the area 171 have been extracted. If a determination of step 157 is negative, the routine returns to step 154 so as to repeat the process of steps 154 to 157. If it is determined, in step 157, that all black runs have been detected, the routine proceeds to step 158.

When the extraction of the black runs is completed, in step 158, the black runs corresponding to the ruled line are selected from among the extracted black runs to be deleted by referring to the contents stored in the black run position storing unit. The information of positions of the selected black runs is stored in the black run position storing unit 107. The information with respect to the black runs which have not been selected is discarded. Thereafter, in step 159, pixels corresponding to the selected black runs, which are to be deleted from the deletion image stored in the deletion image storing unit 104, are changed from black pixels to white pixels by the pixel value changing unit 109 by referring to the information stored in the black run position storing unit 107.

After the deletion of the black runs corresponding to the ruled line in the area 171 is completed, the routine proceeds to step 160. It is determined, in step 160, whether or not the deletion of black runs has been performed for all sides of the area 171. That is, it is determined whether or not the deletion of ruled lines has been performed for each of the upper side, the lower side, the left side and the right side of the area 171. If the determination of step 160 is negative, the routine returns to step 153 so as to repeat the process of steps 153 to 160. If the determination of step 160 is affirmative, that is, if the deletion of ruled lines has been performed for each of the sides of the area 171, the routine is ended.

In the case of the scanning area 172 shown by an enlarged view in FIG. 3-(B), an upper portion 173 of the number "8" written in the character area 171 is included in the scanning area 172. However, since a length of each of the black runs corresponding to the upper portion 173 of the number "8" is less than the predetermined threshold value, information with respect to the positions of the black runs corresponding to the upper portion 173 is not stored in the black run position storing unit 107. That is, the black runs corresponding to the upper portion 173 are not extracted as black runs to be deleted. Accordingly, in the scanning area 171 of the upper side of the character area 172, only the long black runs which correspond to a ruled line are deleted, and black runs which contact or are adjacent to the long black runs corresponding to the ruled line remain in the character area 171.

Figure 4:
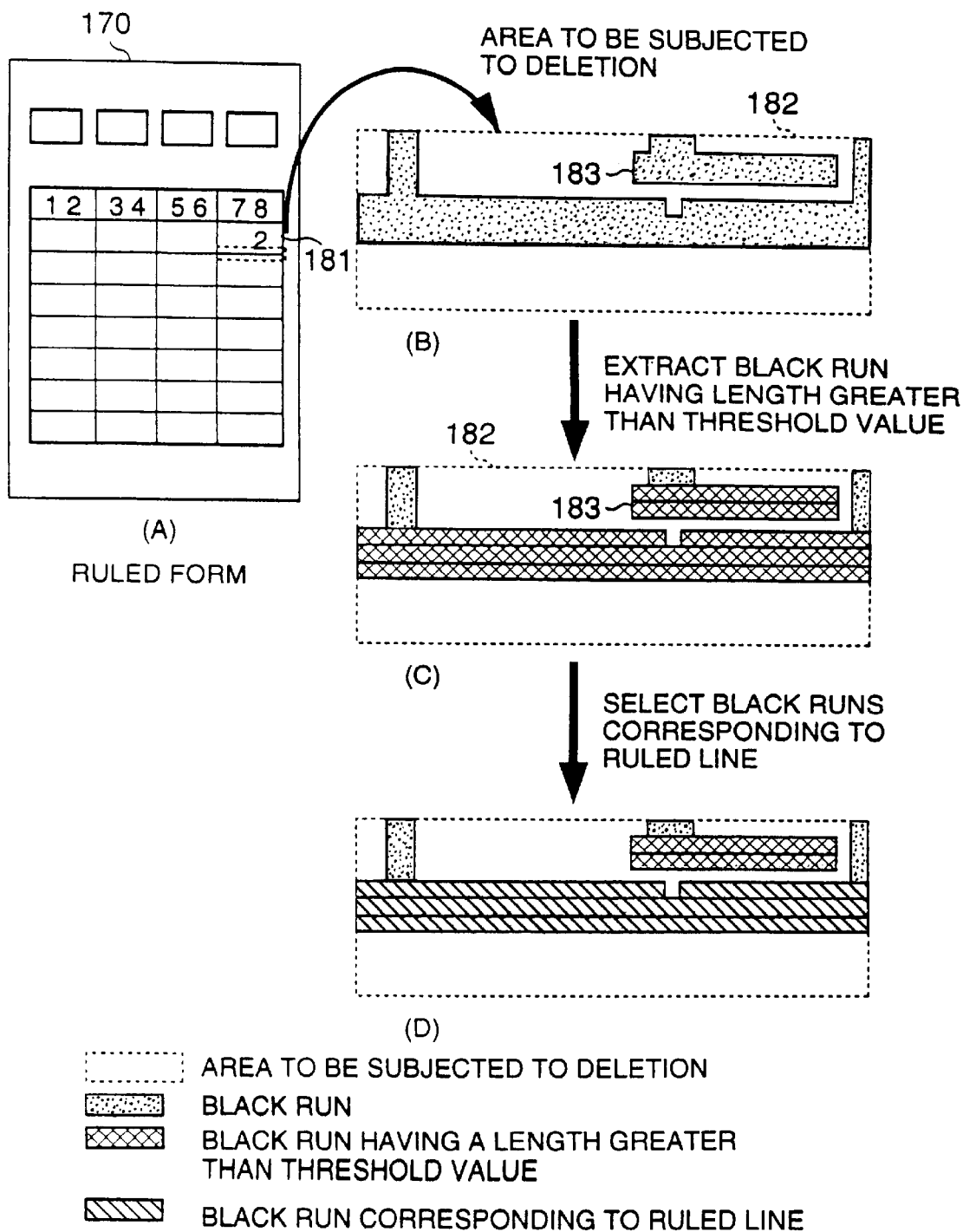
FIG. 4 is an illustration for explaining a process for deleting a ruled line when a long black run which is not a component of the ruled line exists in a scanning area.

As mentioned above, when a length of a black run is short, the black run is not extracted by the black run extracting unit 106. Thus, black runs corresponding to a ruled line are not erroneously deleted when the process of step 158 by the ruled line component selecting unit 108 is not performed. The selection of a component of a ruled line is needed for avoiding an erroneous deletion of a black run when the black run which is adjacent to or in contact with the ruled line has a length greater than the predetermined threshold value. FIG. 4 shows an example of such a case.

As shown in FIG. 4-(A), a number "2" is written in a character area 181 on the ruled form 170. FIG. 4-(B) shows an enlarged view of a scanning area 182 for the lower side of the character area 181. A horizontally extending stroke 183 of the number "2" exists in the scanning area 182 in a position adjacent to the ruled line. Since the black runs corresponding to the horizontally extending stroke 183 of the number "2" have a length greater than the predetermined threshold value, the black runs corresponding to the horizontally extending stroke 183 of the number "2" are extracted by the black run extracting unit 106 as shown in FIG. 4-(C) and information with respect to the position of the black runs corresponding to the horizontally extending stroke of the number "2" is stored in the black run position storing unit 107. However, since the black runs corresponding to the horizontally extending stroke 183 of the number "2" are not components of the ruled line, these black runs are discarded by the ruled line component selecting unit 108. Accordingly, as a result of the process for changing pixel values by the pixel value changing unit 109, only the black runs corresponding to the ruled line are deleted. That is, the black runs corresponding to the horizontally extending stroke 183 of the number "2" remain in the character area 181 as shown in FIG. 4-(D).

In the present embodiment, even when a long black run, which is adjacent to or in contact with a ruled line, exists in the scanning area 182, an erroneous deletion of the long black run is prevented. This means that a black run corresponding to a character can be prevented from being erroneously deleted even if the predetermined threshold value for a length of a black run to be deleted is set to a relatively small value.

As mentioned above, the deletion image is stored in the deletion image storing unit 104, in which deletion image the ruled lines defining the character areas on the ruled form are deleted. The character recognition is performed on the deletion image. Since the ruled lines adjacent to characters written in the character areas have been deleted, the character recognition is not interfered with by the ruled lines, and accurate character recognition can be performed.

Figure 5:
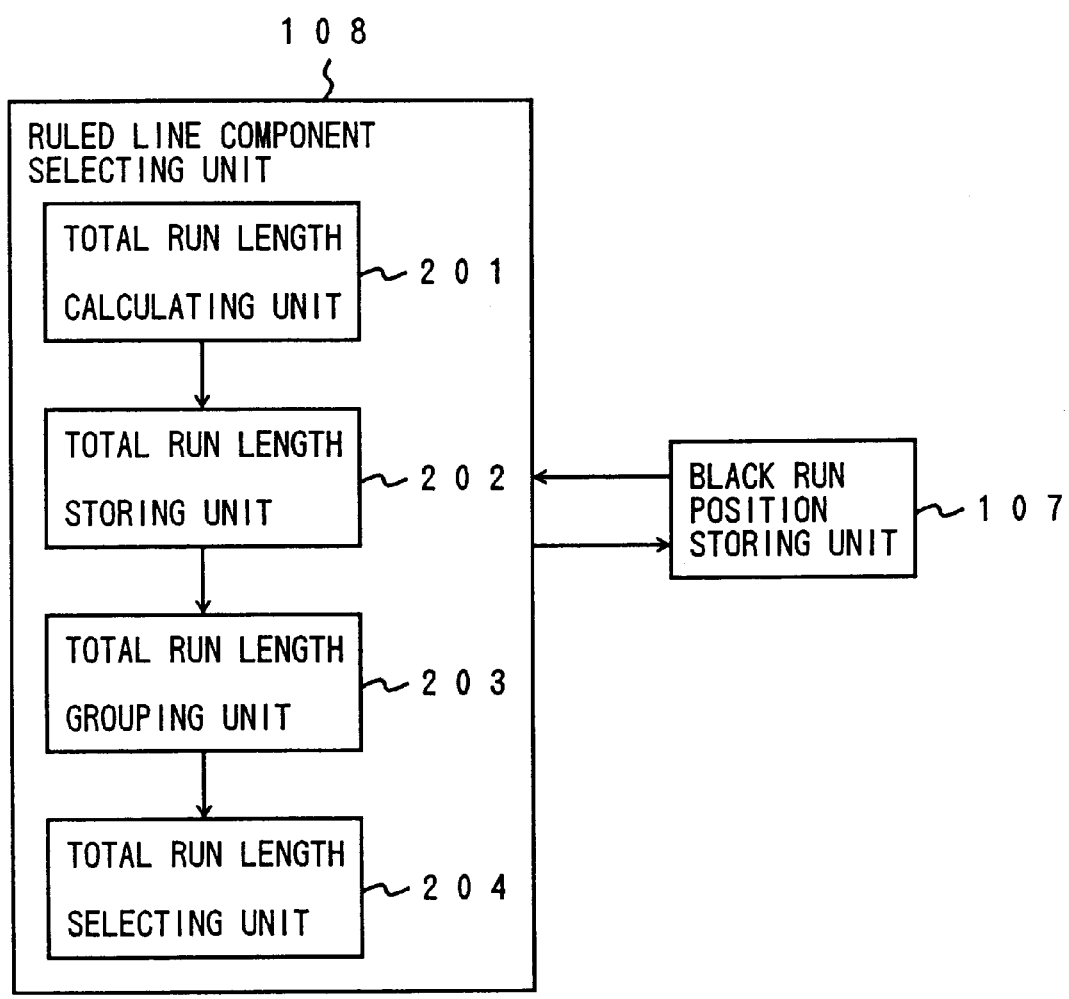
FIG. 5 is a block diagram of a ruled line component selecting unit shown in FIG. 1.

FIG. 5 is a block diagram of the ruled line component selecting unit 108. The ruled line component selecting unit 108 comprises a total run length calculating unit 201, a total run length storing unit 202, a total run length grouping unit 203 and a total run length selecting unit 204.

Figure 6:
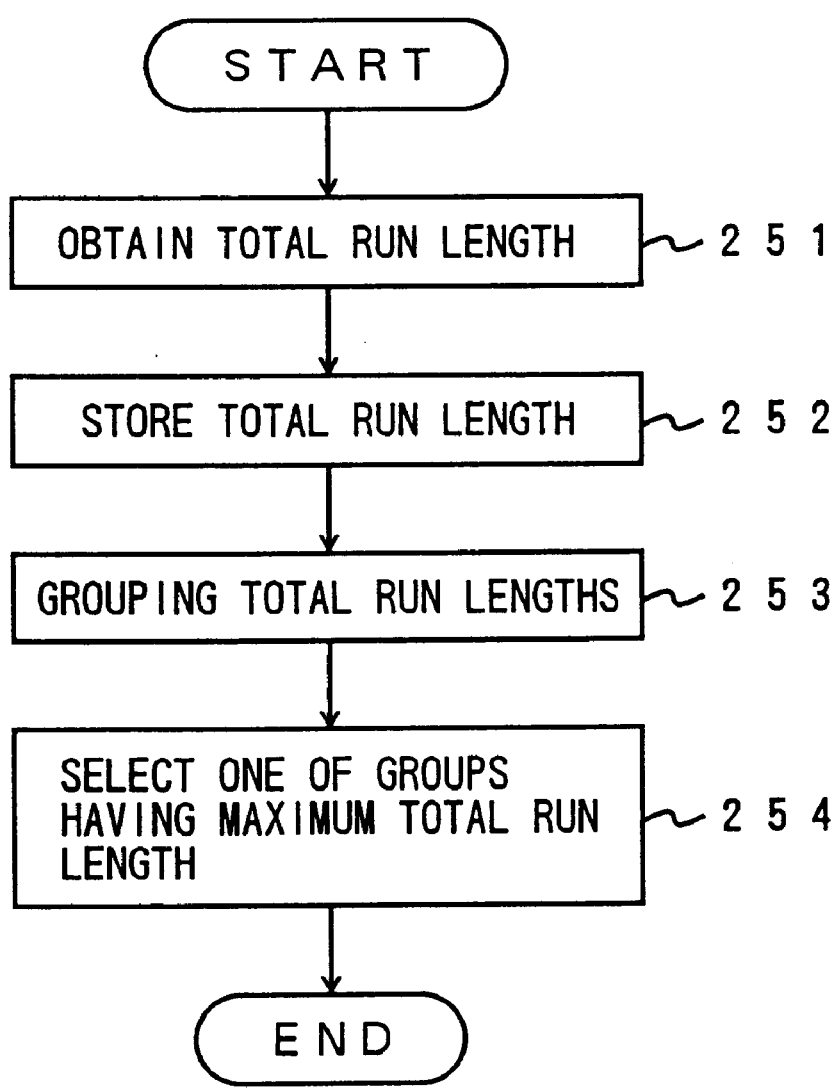
FIG. 6 is a flowchart of an operation performed by the ruled line component selecting unit shown in FIG. 1.

A description will now be given, with reference to FIGS. 6 and 7, of an operation of the ruled line component selecting unit 108. FIG. 6 is a flowchart of the operation performed by the ruled line component selecting unit 108. FIG. 7 is an illustration for explaining the operation of the ruled line component selecting unit 108.

When the operation shown in FIG. 6 is started, the information with respect to positions of the black runs is read, in step 251, from the black run position storing unit 107 by the total run length calculating unit 201. Then, in step 252, the total run length calculating unit 201 sums lengths of the black runs existing in the same vertical position, and stores the result in the total run length storing unit 202. For example, referring to FIG. 7, when black runs are extracted as shown in FIG. 7-(B) by scanning a scanning area for the lower side of a character area 221 shown in FIG. 7-(A), the total length of the black runs existing in the same vertical position is obtained in the form of a histogram as shown in FIG. 7-(C).

Thereafter, in step 253, the black runs adjacent to each other are grouped by referring to the total length in the histogram shown in FIG. 7-(C). That is, the black runs between vertical positions in which no black runs exists are classified into a single group. In the case of FIG. 7-(C), the total lengths are classified into two groups. The total run length selecting unit 204 selects, in step 254, one of the groups which has the maximum total length. The information with respect to the positions of the black runs included in the selected group is stored in the black run position storing unit 107 as components of the ruled line. The information with respect to the reset of the black runs which are classified into a non-selected group are discarded. Accordingly, the black runs which correspond to a ruled line are accurately deleted.

Figure 8:
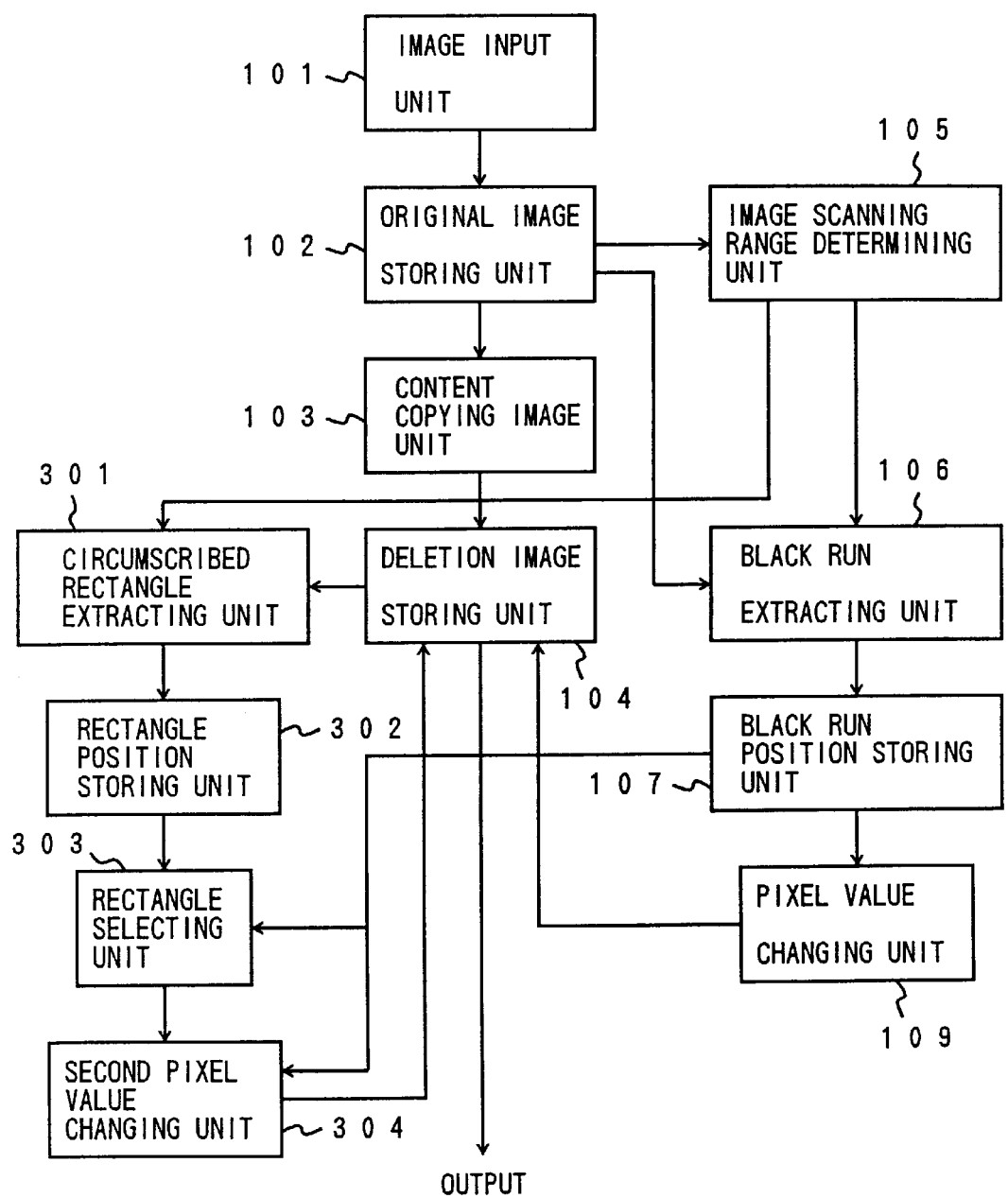
FIG. 8 is a block diagram of a ruled line deleting apparatus according to a second embodiment of the present invention.

A description will now be given, with reference to FIG. 8, of a ruled line deleting apparatus according to a second embodiment of the present invention. In FIG. 8, parts that are the same as the parts shown in FIG. 1 are given the same reference numerals, and descriptions thereof will be omitted.

The ruled line deleting apparatus shown in FIG. 8 deletes ruled lines from an image of a ruled form which is prepared for filling characters or numbers in a block defined by ruled lines. The ruled form has a fixed form and information with respect to the fixed form is known. The deletion of ruled lines is performed prior to a character recognition so that extraction of characters from the image of the ruled form is not interfered with by the ruled lines.

Figure 9:
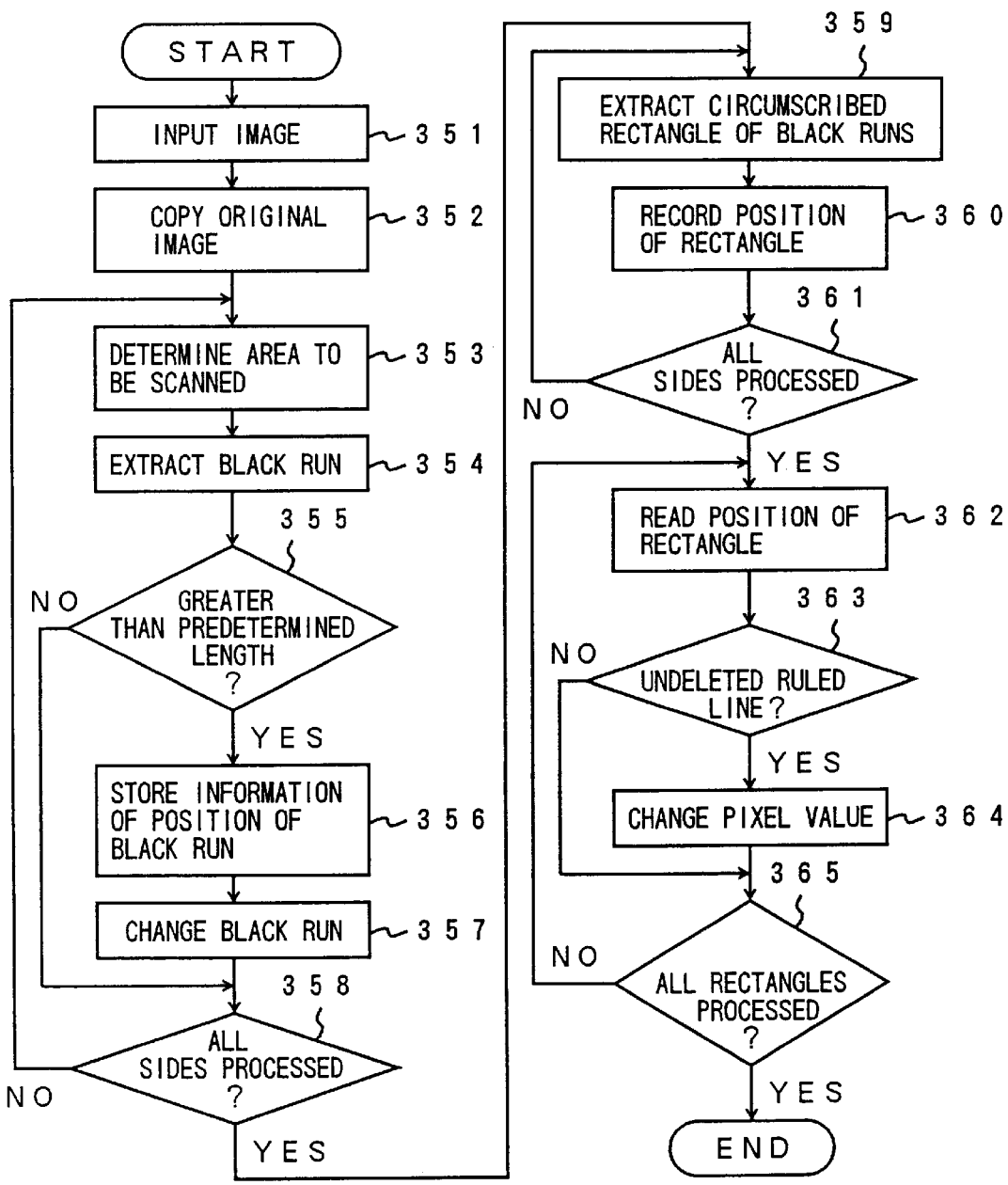
FIG. 9 is a flowchart for a ruled line deleting operation performed by the ruled line deleting apparatus shown in FIG. 8.

As shown in FIG. 9, the ruled line deleting apparatus according to the second embodiment of the present invention comprises an image input unit 101 such as a scanner, an original image storing unit 102, an image content copying unit 103, a deletion image storing unit 104, an image scanning range determining unit 105, a black run extracting unit 106, a black run position storing unit 107 and a pixel value changing unit 109. Additionally, The ruled line deleting apparatus according to the present embodiment further comprises a circumscribed rectangle extracting unit 301, a rectangle position storing unit 302, a rectangle selecting unit 303 and a second pixel value changing unit 304. It should be noted that the ruled line deleting apparatus according to the present embodiment does not include the ruled line component selecting unit 108 shown in FIG. 1. However, the ruled line component selecting unit 108 may be included in the ruled line deleting apparatus according to the present embodiment.

A description will now be given, with reference to FIG. 9, of an operation of the ruled line deleting apparatus shown in FIG. 8. FIG. 9 is a flowchart for a ruled line deleting operation performed by the ruled line deleting apparatus shown in FIG. 8.

The process of steps 351 to 358 is the same as the process of steps 151 to 160 shown in FIG. 2. However, the process for selecting black runs corresponding to components of a ruled line, which is performed by the black run component selecting unit 108, is not performed in the present embodiment. Accordingly, in step 357, the pixel value changing unit 109 changes black pixels corresponding to all of the extracted black runs to white pixels. After the deletion image is stored in the deletion image storing unit 104 in which deletion image long black runs are deleted for each of the upper side, the lower side, the left side and the right side, the routine proceeds to the operation of step 359 and subsequent steps.

Figure 10:
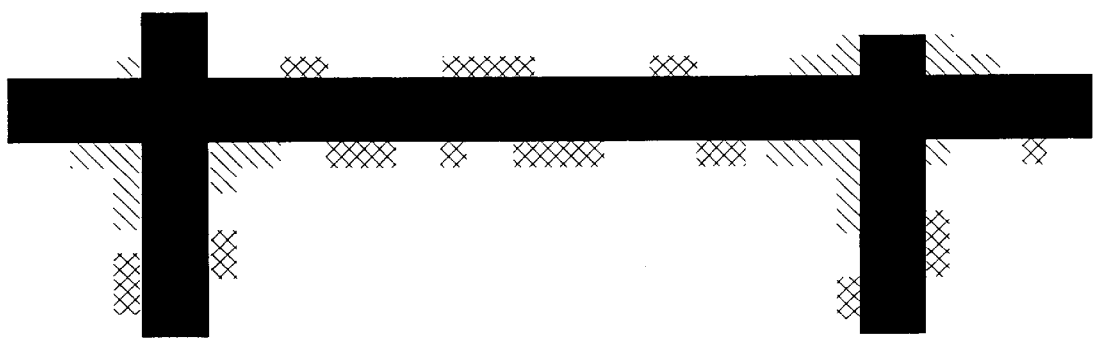
FIG. 10 is an illustration for explaining a short black run generated due to a binarization error or a rounding of a corner of an intersection of ruled lines.

When the ruled form is read by a scanner, a short black run may be generated due to an error occurring in binarization or a rounding of a corner of intersection of ruled lines. Such a short black run has a length less than the predetermined threshold value, and thus it cannot be deleted by the above-mentioned ruled line deleting operation. FIG. 10 is an illustration for explaining the short black run generated due to a binarization error or a rounding of a corner of ruled lines. In FIG. 10, parts in black are black runs corresponding to ruled lines; meshed parts are black runs generated by the binarization error; and hatched parts are black runs generated by rounding of corners of the intersections of the ruled lines.

Figure 11:
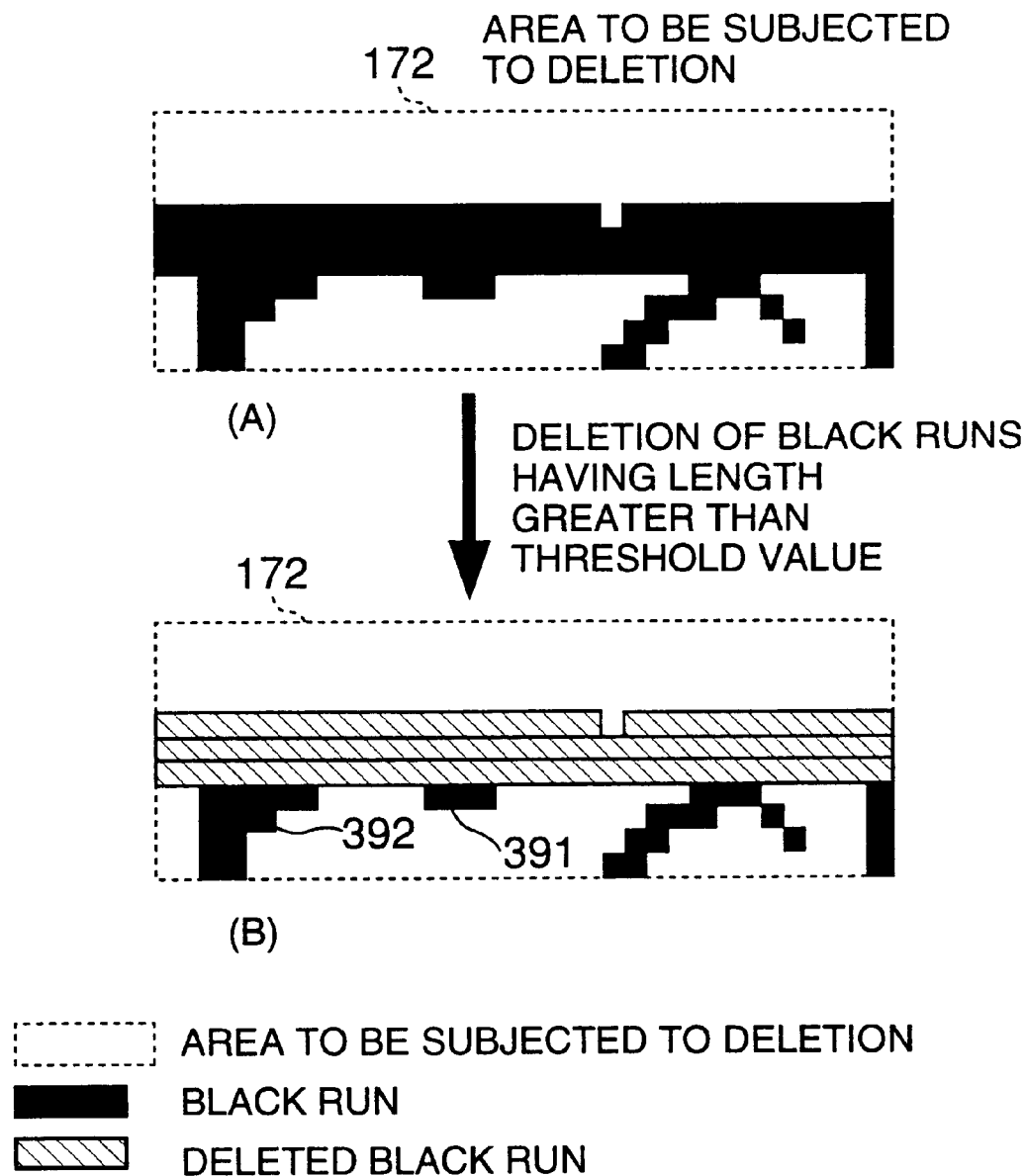
FIG. 11 is an illustration for explaining the short black runs remaining in a scanning area.

For example, if the image of the scanning area 172, which is the upper side of the character area 171 on the ruled form 170 shown in FIG. 3, is that shown in FIG. 11-(A), the result of the process of steps 351 to 358 performed on the image of the scanning area 172 becomes that shown in FIG. 11-(B). That is, a short black run 391 due to binarizing error and a short black run 392 due to roundness of a corner remain in the image. Since these short black runs may cause a character recognition error, the short black runs are deleted by the process of step 359 and steps subsequent to step 359.

In step 359, circumscribed rectangles of black runs extending in the vertical direction or the horizontal direction are extracted from each of the scanning areas of the character areas which are determined by the image scanning range determining unit 105. Then, in step 360, information with respect to the extracted rectangles is stored in the rectangle position storing unit 302. The information stored in the rectangle position storing unit 302 may include coordinate values of the upper left corner and the lower right corner of each of the extracted rectangles. Then it is determined, in step 361, whether or not the process of steps 359 and 360 has been performed on each side. The circumscribed rectangles extracted by the above-mentioned process may correspond to the short black runs which were generated due to binarizing error or rounding and must be deleted.

Thereafter, in step 362, the rectangle selecting unit 303 read the information with respect to the position of the extracted circumscribed rectangles. It is then determined, in step 363, whether or not the circumscribed rectangles are to be deleted. A method for the determination will be described later. If the circumscribed rectangle is to be deleted, the black pixels included in the circumscribed rectangle are changed, in step 364, to white pixels by the second pixel value changing unit 304. Then, it is determined, in step 365, whether or not all of the extracted circumscribed rectangles are have been processed. When all of the extracted circumscribed rectangles have been processed, the routine is ended. Thereafter, extraction of characters and recognition of the characters are performed based on the deletion image stored in the deletion image storing unit 104.

Figure 12:
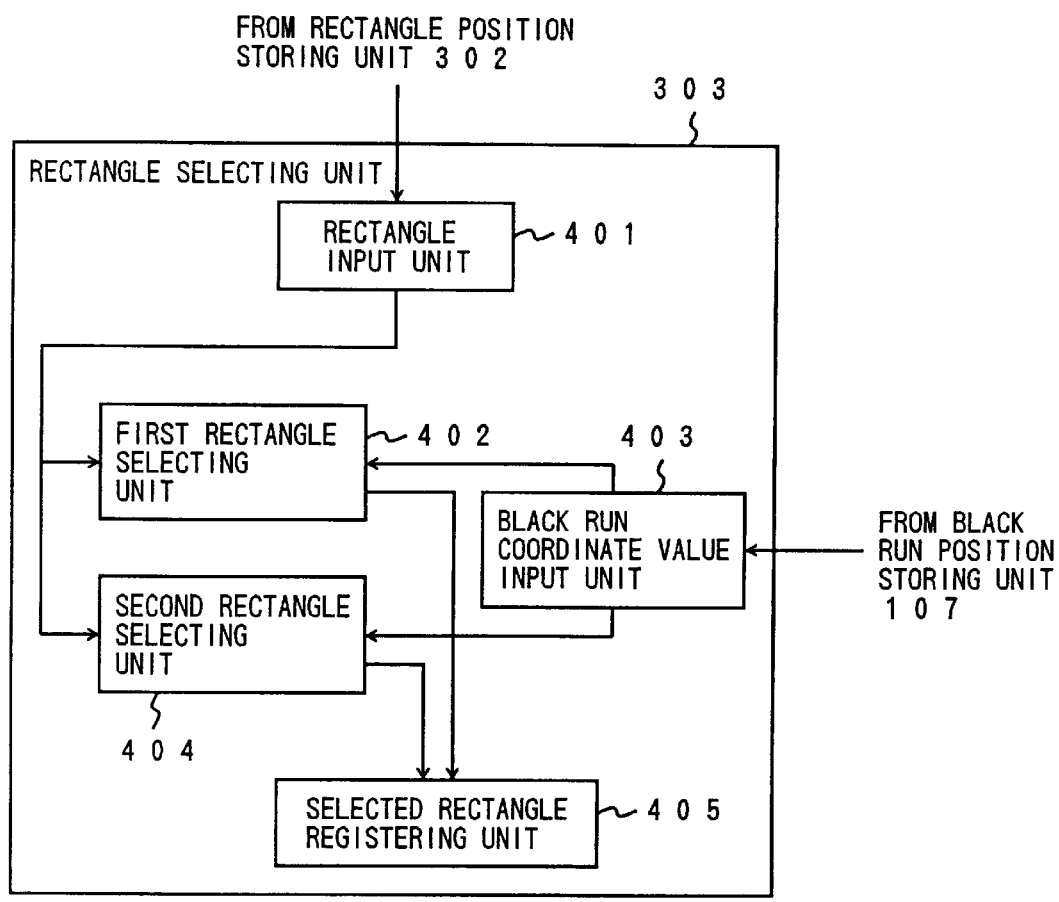
FIG. 12 is a block diagram of a rectangle selecting unit shown in FIG. 8.

FIG. 12 is a block diagram of the rectangle selecting unit 303. The rectangle selecting unit 303 comprises a rectangle input unit 401, a first rectangle selecting unit 402, a black run coordinate value input unit 403, a second rectangle selecting unit 404 and a selected rectangle registering unit 405.

Figure 13:
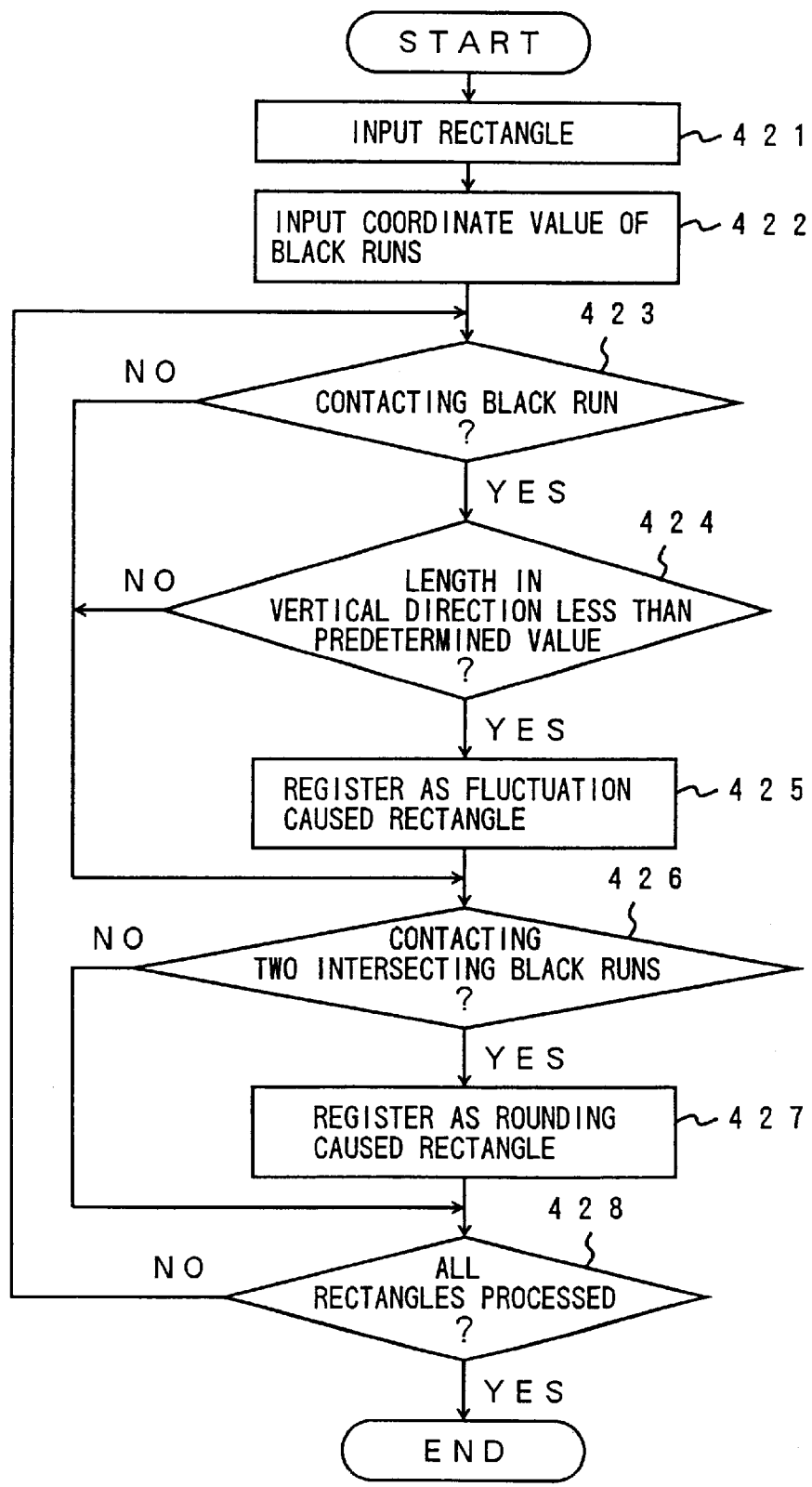
FIG. 13 is a flowchart of an operation of the rectangle selecting unit shown in FIG. 8.

A description will now be given, with reference to FIG. 13, of an operation of the rectangle selecting unit 303. FIG. 13 is a flowchart of the operation of the rectangle selecting unit 303. The rectangle input unit 401 inputs, in step 421, from the rectangle position storing unit 302 information with respect to a position of a circumscribed rectangle as a candidate of black runs to be deleted. Then, in step 422, the black run coordinate value input unit 403 inputs from the black run position storing unit 107 coordinate values of the black runs extracted as components of ruled lines. Then, in the process of steps 423 to 428, it is determined whether or not each of the extracted circumscribed rectangles corresponds to a ruled line to be deleted.

Specifically, in step 423, it is determined by the first rectangle selecting unit 402 whether or not a circumscribed rectangle is in contact with the black runs which were input in step 422. If the circumscribed rectangle is in contact with one of the black runs input in step 422, the routine proceeds to step 424. It is determined, in step 424, whether or not a length of a side of the circumscribed rectangle perpendicular to the extending direction of the black run corresponding to a ruled line is less than a predetermined value. If it is determined that the length of the side is less than the predetermined value, the routine proceeds to step 425. In step 425, the circumscribed rectangle is determined as black runs which were generated due to an erroneous binarization and is to be deleted. The circumscribed rectangle is registered by the selected rectangle registering unit 405 as a ruled line to be deleted due to an erroneous binarization. Hereinafter, the rectangle including black runs generated due to the erroneous binarization is referred to as a fluctuation caused rectangle.

Thereafter, in step 426, it is determined by the second rectangle selecting unit 404 whether or not the circumscribed rectangle is in contact with both the black runs which are perpendicular to each other among the black runs input in step 422. If the circumscribed rectangle is in contact with the two black runs input in step 422, the routine proceeds to step 427. In step 427, the circumscribed rectangle is determined as black runs which were generated due to rounding of a corner of an intersection of ruled lines and is to be deleted. The circumscribed rectangle is registered by the selected rectangle registering unit 405 as a ruled line generated due to a rounding of a corner of an intersection of ruled lines. Hereinafter, the rectangle including black runs generated due to the rounding of a corner of an intersection of ruled lines is referred to as a rounding caused rectangle. Then, in step 428, it is determined whether or not all of the circumscribed rectangles have been processed. If it is determined that all of the circumscribed rectangles have been processed, the routine is ended. Otherwise, the routine returns to step 423 to repeat the process of steps 423 to 428.

Thereafter, both the registered fluctuation caused rectangles and the registered rounding caused rectangles are subject to a pixel value changing process by the second pixel value changing unit 304 so that the black runs included in the registered rectangles are changed to white pixels. The pixel value changing process applied to the fluctuation caused rectangles is different from the pixel value changing process applied to the rounding caused rectangles.

Figure 14:
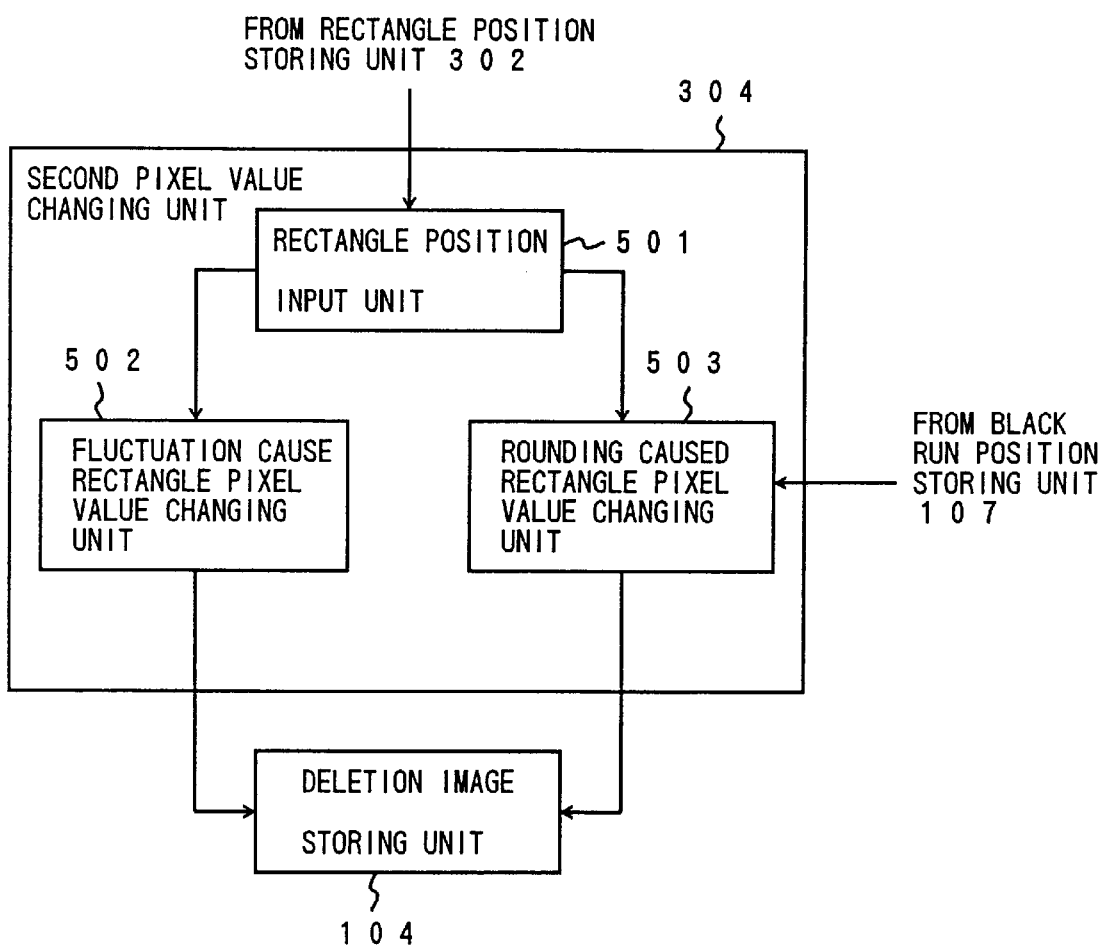
FIG. 14 is a block diagram of a second pixel value changing unit shown in FIG. 8.

FIG. 14 is a block diagram of the second pixel value changing unit 304 which performs the pixel value changing process in accordance with the cause of generation of the rectangles. As shown in FIG. 14, the second pixel value changing unit 304 comprises a rectangle position input unit 501, a fluctuation caused rectangle pixel value changing unit 502 and a rounding caused rectangle pixel value changing unit 503.

Figure 15:
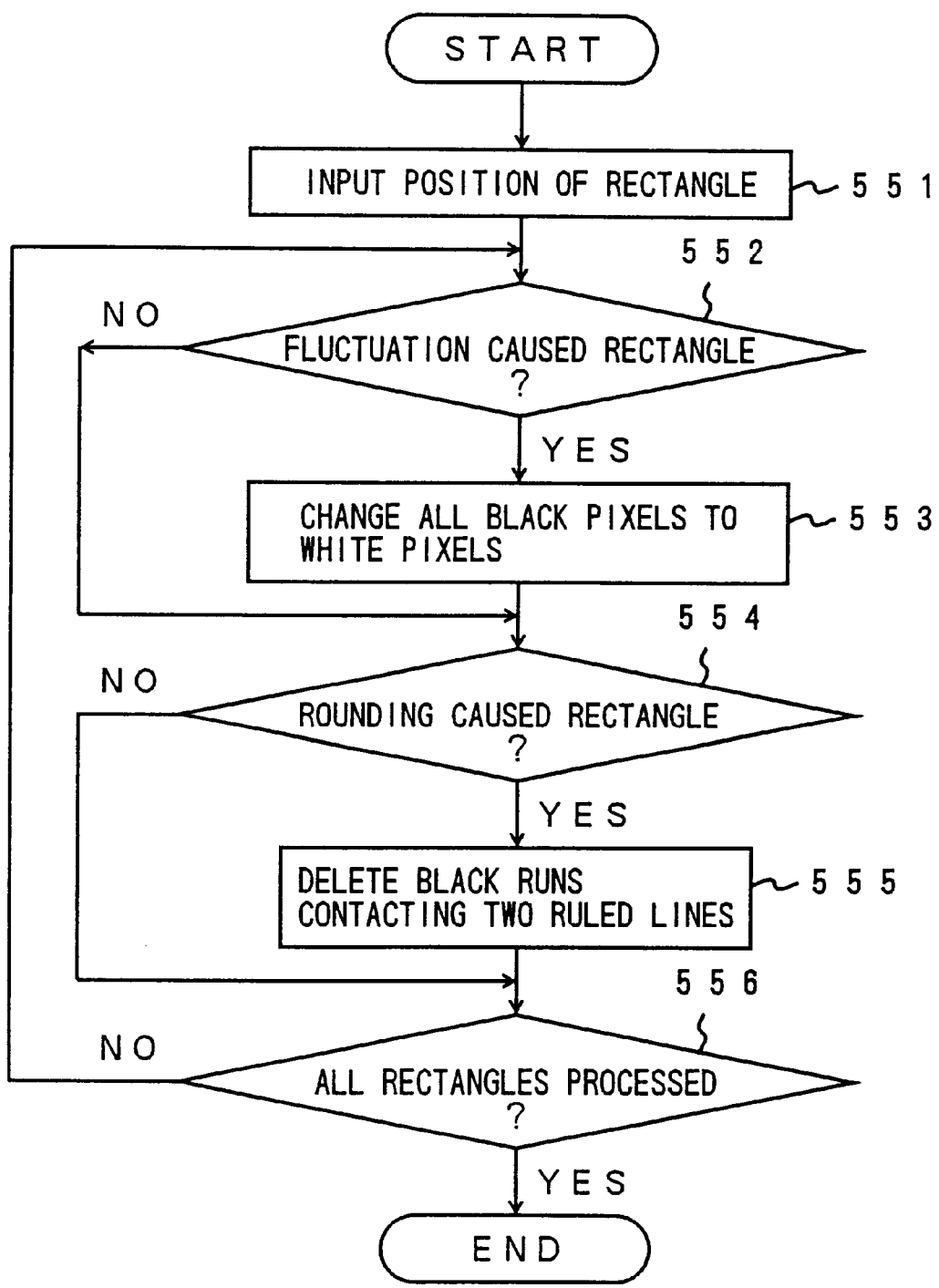
FIG. 15 is a flowchart of an operation of the second pixel value changing unit shown in FIG. 8.

A description will now be given, with reference to FIG. 15, of an operation of the second pixel value changing unit 304. FIG. 15 is a flowchart of the operation of the second pixel value changing unit 304.

When the operation shown in FIG. 15 is started, the rectangle position input unit 501 inputs, in step 551, from the rectangle selecting unit 303 (refer to FIG. 8) the information with respect to a position of the circumscribed rectangle which is determined to correspond to an undeleted ruled line. Then, it is determined, in step 552, whether or not the circumscribed rectangle is registered as a fluctuation caused rectangle. If it is determined that the circumscribed rectangle is registered as the fluctuation caused rectangle, the routine proceeds to step 553. In step 553, the information with respect to the position of the circumscribed rectangle is input to the fluctuation caused rectangle pixel value changing unit 502 so that all black pixels included in the circumscribed rectangle are changed to white pixels. If it is determined, in step 552, that the circumscribed rectangle is not registered as the fluctuation caused rectangle, the routine skips step 553 and proceeds to step 554.

In step 554, it is determined whether or not the circumscribed rectangle is registered as a rounding caused rectangle. If it is determined that the circumscribed rectangle is registered as the rounding caused rectangle, the routine proceeds to step 555. In step 555, the information with respect to the position of the circumscribed rectangle is input to the rounding caused rectangle pixel value changing unit 503 so that black pixels included in the circumscribed rectangle are changed to white pixels. If it is determined, in step 554, that the circumscribed rectangle is not registered as the rounding caused rectangle, the routine skips step 555 and proceeds to step 556.

As mentioned above, the pixel value changing process is performed, in step 553, by the fluctuation caused rectangle pixel value changing unit 502. In this pixel value changing process, the fluctuation caused rectangle pixel value changing unit 502 scans an area of the deletion image within the fluctuation caused circumscribed rectangle so as to change the black pixels included in the fluctuation caused rectangle to white pixels. On the other hand, the pixel value changing process is performed, in step 555, by the rounding caused rectangle pixel value changing unit 503. In this pixel value changing process, the rounding caused rectangle pixel value changing unit 503 scans an area of the deletion image within the rounding caused rectangle so as to change a part of black runs included in the rounding caused rectangle to white pixels. More specifically, in the process performed by the rounding caused rectangle pixel value changing unit 503, the black runs extending in the vertical direction and the horizontal direction are extracted. The black runs contacting both the black runs corresponding to ruled lines which intersects with each other are changed to white pixels.

After the circumscribed rectangle is subjected to the process performed by the fluctuation caused rectangle pixel value changing unit 502 or the rounding caused rectangle pixel value changing unit 503, it is determined, in step 556, whether or not all of the extracted circumscribed rectangles have been processed. If it is determined that all of the extracted circumscribed rectangles have been processed, this means that the short black runs, which are generated due to an erroneous binarization or rounding of a corner of an intersection of ruled lines, are deleted from the deletion image stored in the deletion image storing unit 104, and thus the routine is ended. Otherwise, the routine returns to step 552 so as to repeat the process of steps 552 to 556.

Figure 16:
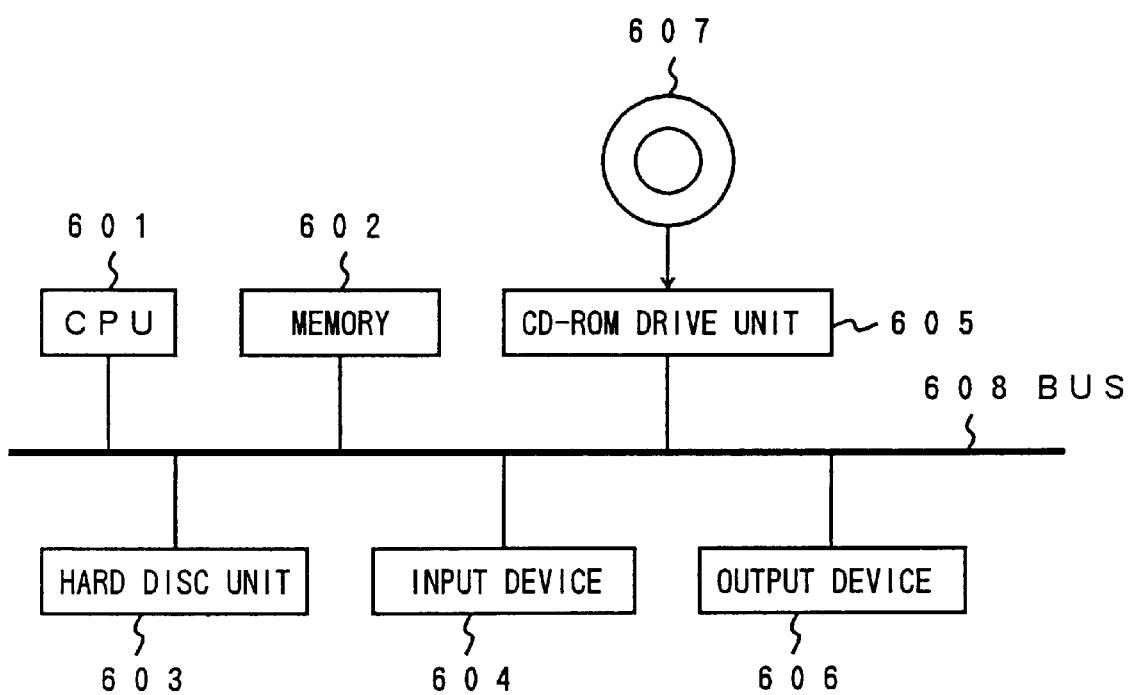
FIG. 16 is an illustration of a structure of a computer which performed a ruled line deleting operation according to the present invention.

The operations performed in the above-mentioned first and second embodiments can be achieved by software installed in a conventional computer. FIG. 16 is an illustration of a structure of a computer which can perform the operations performed by the embodiments according to the present invention. In FIG. 16, the computer comprises a CPU 601, a memory 602, a hard disc unit 603, an input device 604 such as a scanner, a CD-ROM drive unit 605 and an output device 606 such as a display unit. These parts are interconnected via a bus 608.

The image of the ruled form is read by the input unit 604, and stored in the hard disc unit 603. Programs for performing the operations of the above-mentioned embodiments may also be stored in the hard disc unit 603 or recorded on a CD-ROM 607 which can be read by the CD-ROM drive unit 605. The CPU 601 reads the programs on the CD-ROM 607 via the CD-ROM drive unit 605 and stores the program in the memory 602. The CPU 601 executes the ruled line deleting operation in accordance with the programs stored in the memory 602. The deletion image is stored in the hard disc unit 603, or output to the display unit 606.

The present invention is not limited to the specifically disclosed embodiments, and variations and modifications may be made without departing from the scope of the present invention.

What is claimed is:

1. A method for deleting a ruled line from an image of a ruled form which includes a plurality of ruled lines for defining at least one character area, comprising the steps of:

defining a scanning area on the image of the ruled form which encompasses the ruled lines and a portion of a character area which is within a predetermined distance from the ruled lines which define a border of said character area;

extracting from said ruled line to be deleted black runs having a length greater than a predetermined length from said scanning area; and changing black pixels corresponding to the extracted black runs to white pixels in the image of said ruled line to be deleted.

2. The method as claimed in claim 1, wherein said changing step comprises the steps of:

selecting black runs corresponding to a ruled line from among the extracted black runs; and, changing black pixels corresponding to the black runs selected in said selecting step to white pixels.

3. The method as claimed in claim 2, wherein said selecting comprises the steps of:

summing lengths of black runs which extend in the same coordinate position of a coordinate axis perpendicular to the extending direction of the black runs, the summing being performed for each coordinate position in the scanning area;

grouping the black runs having consecutive coordinate positions;

determining a group of black runs which has the maximum summed length; and, selecting black runs included in the group determined by said determining step.

4. The method as claimed in claim 1, further comprising the steps of:

extracting circumscribed rectangles from the scanning area of the image which has been obtained by executing said changing step, each of the circumscribed rectangles including black pixels consecutive in the extending direction of the ruled line;

selecting a circumscribed rectangle from among the extracted circumscribed rectangles so that the selected circumscribed rectangle is in contact with one of the black runs extracted in said extracting step and a length of the selected black run in a direction perpendicular to an extending direction of the one of the black runs is less than a predetermined value; and, changing black pixels corresponding to the black runs included in the circumscribed rectangle selected in said selecting a circumscribed rectangle step to white pixels.

5. The method as claimed in claim 1, further comprising the steps of:

g) extracting circumscribed rectangles from the scanning area of the image which has been obtained by executing said changing step, each of the circumscribed rectangles including black pixels consecutive in the extending direction of the ruled line;

selecting a circumscribed rectangle from among the extracted circumscribed rectangles so that the selected circumscribed rectangle is in contact with two of the black runs extracted in said extracting step, the two black runs intersecting with each other; and, changing black pixels corresponding to the black runs included in the circumscribed rectangle selected in said selecting step to white pixels.

6. A processor readable medium storing program code for causing a computer to delete a ruled line from an image of a ruled form which includes a plurality of ruled lines for defining at least one character area, comprising:

a first program code device configured to define a scanning area on the image of said ruled form which encompasses the ruled lines and a portion of a character area which is within a predetermined distance from the ruled lines which define a border of said character area;

a second program code device configured to extract from said ruled line to be deleted black runs having a length greater than a predetermined length from said scanning area; and a third program code device configured to change black pixels corresponding to the extracted black runs to white pixels in the image of said ruled line to be deleted.

7. The processor readable medium as claimed in claim 6, wherein the third program code device comprises:

a fourth program code device configured to select black runs corresponding to a ruled line from among the extracted black runs; and, a fifth program code device configured to change black pixels corresponding to the black runs selected by the fourth program code device to white pixels.

8. The processor readable medium as claimed in claim 7, wherein the fourth program code device comprises:

a sixth program code device configured to sum lengths of black runs which extend in the same coordinate position of a coordinate axis perpendicular to the extending direction of the black runs, the summing being performed for each coordinate position in the scanning area;

a seventh program code device configured to grap the black runs having consecutive coordinate positions;

a eighth program code device configured to determine a group of black runs which has the maximum summed length; and, a ninth program code device configured to select black runs included in the group determined by the eighth program code device.

9. The processor readable medium as claimed in claim 6, further comprising:

a fourth program code device configured to extract circumscribed rectangles from the scanning area of the image which has been obtained by the third program code device, each of the circumscribed rectangles including black pixels consecutive in the extending direction of the ruled line;

a fifth program code device configured to select a circumscribed rectangle from among the extracted circumscribed rectangles so that the selected circumscribed rectangle is in contact with one of the black runs extracted by the second program code device and a length of the selected black run in a direction perpendicular to an extending direction of the one of the black runs is less than a predetermined value; and, a sixth program code device configured to change black pixels corresponding to the black runs included in the circumscribed rectangle selected by the fifth program code device to white pixels.

10. The processor readable medium as claimed in claim 6, further comprising:

a fourth program code configured to extract circumscribed rectangles from the scanning area of the image which has been obtained by the third program code device, each of the circumscribed rectangles including black pixels consecutive in the extending direction of the ruled line;

a fifth program code device configured to select a circumscribed rectangle from among the extracted circumscribed rectangles so that the selected circumscribed rectangle is in contact with two of the black runs extracted by the second program code device, the two black runs intersecting with each other; and, a sixth program code device configured to change black pixels corresponding to the black runs included in the circumscribed rectangle selected by the fifth program code device to white pixels.

* * * * *